United States Patent [19]

Cohen et al.

[11] Patent Number: 5,059,278

[45] Date of Patent: Oct. 22, 1991

[54] SELECTIVE CHEMICAL REMOVAL OF COIL SEED-LAYER IN THIN FILM HEAD MAGNETIC TRANSDUCER

[75] Inventors: Uri Cohen, Palo Alto, Calif.; Wei C. Hsie, Eden Prairie, Minn.

[73] Assignee: Seagate Technology, Scotts Valley, Calif.

[21] Appl. No.: 590,007

[22] Filed: Sep. 28, 1990

[51] Int. Cl.$^5$ ............................ B44C 1/22; C23F 1/02
[52] U.S. Cl. ........................................ 156/643; 29/603; 156/656; 156/659.1; 360/123
[58] Field of Search ................... 29/603; 156/643, 646, 156/650, 656, 659.1, 664; 427/127, 128, 131; 360/123, 125; 252/79.2

[56] References Cited

U.S. PATENT DOCUMENTS

| | | | |
|---|---|---|---|
| 3,662,119 | 5/1972 | Romankiw et al. | 179/100.2 C |
| 3,723,665 | 3/1973 | Lazzari et al. | 179/100.2 C |
| 3,781,476 | 12/1973 | Hanazono | 179/100.2 C |
| 3,853,715 | 12/1974 | Romankiw | 204/15 |
| 4,044,394 | 8/1977 | Hanazono | 360/123 |
| 4,127,884 | 11/1978 | Nouchi et al. | 360/119 |
| 4,158,213 | 6/1979 | Griffith | 360/121 |
| 4,165,525 | 8/1979 | Koel | 360/125 |
| 4,190,872 | 2/1980 | Jones et al. | 360/125 |
| 4,219,853 | 8/1980 | Albert et al. | 360/103 |
| 4,219,854 | 8/1980 | Church et al. | 360/123 |
| 4,219,855 | 8/1980 | Jones et al. | 360/125 |
| 4,241,367 | 12/1980 | Nomura et al. | 360/127 |
| 4,373,173 | 2/1983 | Robinson et al. | 360/121 |
| 4,376,337 | 3/1983 | Kobayasi et al. | 29/603 |
| 4,539,616 | 9/1985 | Yuito et al. | 360/125 |
| 4,613,404 | 9/1986 | Tabei | 156/643 |
| 4,652,954 | 3/1987 | Church | 360/120 |
| 4,743,988 | 5/1988 | Sato et al. | 360/126 |
| 4,791,719 | 12/1988 | Kobayashi | 29/603 |

OTHER PUBLICATIONS

C. J. Mogab, "Dry Etching", Chap. 8, VLSI Technology, edited by S. M. Sze, pp. 303–344, McGraw-Hill Book Company (1983).

J. J. Kelly and C. H. de Minjer, Journal Electrochemical Society, vol. 122(7), pp. 931–936.

J. C. Lier et al., IEEE Transactions on Magnetics, vol. MAG-12, No. 6, pp. 716–718, Nov. 1976.

M. Hanazono et al., IEEE Transactions on Magnetics, vol. MAG-15, No. 6, pp. 1616–1618, Nov. 1979.

Primary Examiner—William A. Powell
Attorney, Agent, or Firm—Dorsey & Whitney

[57] ABSTRACT

The seed-layer, or metallization layer, used to form the coil winding in a thin film head (TFH) by electrodeposition, is removed from between individual winding turns by selective etching with an etchant which preferentially, or selectively, attacks the seed-layer while leaving the coil winding, insulation, and gap materials essentially intact. A suitable combination of compatible materials which can be used as the seed-layer, coil winding, and etchant, respectively, in practicing this invention comprises nickel-iron Permalloy, copper, and a mixture of nitric acid and phosphoric acid diluted in pure water. Other combinations of materials and types of etching processes suitable for this invention are also disclosed.

26 Claims, 3 Drawing Sheets

SELECTIVE CHEMICAL REMOVAL OF COIL SEED-LAYER IN THIN FILM HEAD MAGNETIC TRANSDUCER

BACKGROUND OF THE INVENTION

1. Field of the Invention

This invention relates to magnetic thin film heads (TFH) for recording and reading magnetic transitions on a moving magnetic medium. In particular, the invention relates to a method of selectively etching the seed-layer, or metallization-layer, between the coil turns, or winding, without attacking the coil turns, the pole gap, or the insulation.

2. Background of the Prior Art

Magnetic TFH transducers are known in the prior art. See, e.g. U.S. Pat. Nos. 4,016,601; 4,190,872; 4,652,954; 4,791,719. In operation of a typical device utilizing a TFH transducer, a moving magnetic storage medium is placed near the exposed pole tips of the TFH transducer. During the read operation, the changing magnetic flux of the moving storage medium induces changing magnetic flux upon the pole tips and gap between them. The magnetic flux is carried through the pole tips and yoke core around spiralling conductor coil winding turns located between the yoke arms. The changing magnetic flux induces an electrical voltage across the conductor coil. The larger the number of coil turns, the larger this voltage. The electrical voltage is representative of the magnetic pattern stored on the moving magnetic storage medium. During the write operation, an electrical current is caused to flow through the conductor coil. The current in the coil induces a magnetic field across the gap between the pole tips. A fringe field extends into the nearby moving magnetic storage medium, inducing (or writing) a magnetic domain (in the medium) in the same direction. Impressing current pulses of alternating polarity across the coil causes the writing of magnetic domains of alternating polarity in the storage medium.

In the manufacturing of TFH transducers for magnetic recording, a large number of devices are usually fabricated simultaneously in deposited layers on a ceramic wafer. When completed, the wafer is cut (or diced) and machined into the individual transducers. The four main elements of a TFH transducer, roughly in the order in which they are deposited, are the bottom magnetic pole, the flux gap material to provide spacing between the bottom and top magnetic pole tips, one or more levels of electrical conducting coil winding interposed within insulation layers, and the top magnetic pole. One or more levels of coil winding may be constructed.

Usually the magnetic poles are made of a nickel-iron alloy (called Permalloy), and the coil winding is made of copper. To form each level of the coil winding, a continuous metallic electrical conductive layer called "metallization-layer" or "seed-layer", is first deposited over the entire wafer's surface (consisting at this stage of gap and insulation layers). The seed-layer consists of a single-layer or multiple-layer and is commonly deposited by vacuum deposition techniques, such as sputtering or evaporation. The common seed-layer for coil deposition consists of Cu/Cr or Cu/Ti. Cr or Ti are used as the bottom layer to enhance adhesion to the insulation and alumina surfaces. The seed-layer renders the wafer's surface electrically conducting and thus appropriate for successive electroplating. Following the deposition of the seed-layer, a photoresist is applied to the surface and is photolithographically patterned to expose the seed-layer where the spiral coil winding turns are to be formed. The wafer is then placed in an electroplating cell and the required metal (Cu) is electroplated through the photoresist mask onto the exposed areas of the seed-layer. The rest of the area on the wafer is protected by the non-conductive photoresist, and there is no electrodeposition in this area. After electrodeposition, the photoresist is stripped-off, leaving plated area connected by seed-layer. The seed-layer must be removed from the area previously protected by the photoresist (and which was not electroplated), so that it will not short between areas of the electroplated metal. The common ways to remove the seed-layer are by sputter-etching or ion-milling (both of which are vaccum techniques), or by wet chemical etching (with two different etchants in succession: first for Cu, then for Cr or Ti). The formation of a coil winding is generally discussed in U.S. Pat. Nos. 4,539,616 4,127,884; 4,165,525; and 4,219,853.

It is here that problems have in the past existed. The coil winding wall is tall relative to the spacing between the coil turns, so that the seed-layer is located in relatively deep, narrow valleys between the individual turns. Sputter-etching of the entire area is the usual process to remove the inter-turn seed-layer, but it requires, to assure that all of the seed-layer has been removed, also the removal of a substantial thickness of the electrodeposited copper winding and other features of the partially completed head. The same problem exists if ion-milling, conventional wet chemical etching, or any other indiscriminate or non-selective process is used over the entire surface.

The vacuum techniques (sputter-etching and ion-milling) are costly and time consuming. They require expensive equipment, and the throughput is low. Also, these techniques are indiscriminate or non-selective. That is to say, they result in removal of material from the entire exposed surface of the wafer. The seed-layer, as well as a layer of similar thickness in the plated areas, is etched or milled off. To ensure complete removal of the seed-layer, the etching or milling is usually carried out for a longer time than is necessary. This extra time is used to ensure consistently complete removal of the seed-layer from manufacturing run to manufacturing run. However, the extra etching or milling time results in partial removal of previously deposited layers, such as the gap, insulation, and plated layers.

The undesireable etching of the gap and insulation has been described in U.S. Pat. No. 4,652,954, and is referred to as the "gap-wedge" and "zero-throat recession", respectively. U.S. Pat. No. 4,652,954 teaches the use of a gap protective layer, such as Cr, to protect the gap during the etching. Sputter-etching or ion-milling of the insulation layer (commonly consisting of cured photoresist) results in hard to control and non-reproducible "zero-throat" height. However, the gap protective layer of U.S. Pat. No. 4,652,954 does not prevent insulation recession due to sputter-etching or ion-milling. The plated metal coil (Cu) is also affected by the non-selective etching, resulting in hard to control and nonreproducible thickness of the Cu in the coil windings and, correspondingly, variable coil resistance.

Because the vacuum etching techniques are dependent on bombardment by accelerated ions, they are highly directional and may also cause the seed-layer to impregnate the layer below. In areas where the seed-layer is shadowed by elevated features with wall angle larger than 90° (such as the electroplated features), the seed-layer may not be completely removed. The incomplete removal of the seed-layer and/or the degradation of insulation may cause leakage currents or elecrical shorts or electrical discharge from head to disk during contact, as well as presenting potential reliability problems. The latter, for instance, might be caused by galvanic dissimilar metals in exposed pole-tips corners, which significantly increase the susceptibility of pole-tips to environmental corrosion. A common example is the presence of Cu seed-layer residues along the edges of poles. Such residues, sometimes called "wings", are most undesireable. If, on the other hand, an attempt is made to remove all traces of the seed layer by prolonged vacuum etching, there is a danger of removing too much coil material, because it is subject to the same bombardment and etches more rapidly.

The conventional non-selective wet chemical etching combines two steps of different etchants, first for CU, then for Cr (or Ti). During the wet etching of the CU seed-layer, the plated Cu coil windings are also etched, thereby decreasing their width and thickness and increasing the coil resistance. The time to clear (or etch) the Cu seed-layer from between the coil winding turns varies considerably from wafer to wafer, from lot to lot, and across the wafer itself. It thus results in poor or no control of the coil winding width and thickness and, correspondingly, the coil resistance. Also, additional wet etchant is required for the Cr or Ti adhesion layer.

SUMMARY OF THE INVENTION

The present invention describes a method of selective chemical etching (SCE) which avoids the prior-art problems. SCE is based on a significantly faster (or preferential) chemical dissolution rate of one solid material compared with other solid materials, while all are in contact with a specific fluid chemical etchant. To be adequate for SCE, the etchant must not significantly attack or dissolve any of the other solid materials that come in contact with it during the etching time. These include underlaid solid materials that become exposed to the etchant when the preferentially (or selectively) etched solid material is removed by SCE. Also, the etching rate of the selectively etched solid material must not be too fast to cause uncontrollable undercut and over-etch, and not too slow to render it impractical. An adequate SCE for a specific metal (or alloy) in a TFH structure, requires an etchant that does not significantly attack or etch other exposed metals (or alloys), the gap, or the insulation materials throughout the entire etching operation, yet selectively dissolves the specified metal (or alloy) at a moderate and controllable rate.

The present invention provides selective chemical etching for the coil seed-layer utilized in the wafer fabrication of TFH devices, in order to replace the prior art non-selective sputter-etching, ion-milling, or wet-etching. SCE of the seed-layer is economical, fast, and simple. It does not require the expensive vacuum equipment, and the throughput is high. Also of importance, SCE is isotropic (nondirectional) in nature, thus removing the seed-layer from all unwanted areas, including the hard-to-reach and shadowed areas (adjacent to tall features with wall angles larger than 90°). Thus, the seed-layer residue that is often found with prior-art methods, can be completely eliminated by the use of SCE. The complete removal of seed-layer residues significantly reduces electrical shorts and potential corrosion problems in the pole wing areas. In addition, SCE significantly reduces problems such as gap-wedge and zero-throat recession (even without a gap protective layer), and the hard to control and nonreproducible thickness compensation of various layers due to their partial etching by the non-selective methods of the prior-art. SCE does not significantly attack any of the other solid materials (such as the gap material, the insulation material, or the plated metals), thus preserving the original dimensions of such materials. Because SCE (unlike vacuum etching) causes no impregnation of the seed-layer into the insulation layer, it mitigates the possibility of electrical discharge from head to disk during contact. It also helps to preserve the symmetric pulse shape desired for writing.

The problem of indiscriminate attack on device features and previously placed layers that may occur during the manufacturing step which removes the seed-layer between the coil winding turns, is overcome in this invention by using appropriate combinations of a seed-layer material chemically distinct from the coil winding material and a selective chemical etchant fluid. The etchant fluid selectively or preferentially attacks the seed-layer but not the other layers and features of the structure already in place. If the seed-layer consists of two or more chemically distinct layers (multiple-seed-layer), then multiple selective etchants may be required to operate successively in order to remove all the layers of the seed-layer. This is accomplished by choosing an electrical conductive seed-layer material (or materials) chemically distinct from the coil winding material, usually copper. The seed-layer is then removed by a selective etchant which preferentially attacks or dissolves the seed-layer significantly faster than the coil winding and other device layers (already in place) which are or may also become exposed to the etchant fluid.

The invention is embodied in a process for forming a magnetic thin film head transducer, including the steps of depositing a first metallic conductive seed-layer on the wafer surface, forming on the seed-layer a photoresist mask pattern defining the shape of a spiral coil winding for the head, and depositing through the photoresist mask onto the exposed seed-layer a second metallic conductive material, chemically distinct from the seed-layer, to form the coil winding. The process if further modified to include (a) depositing a first single-layer or multiple-layer conductive metal or alloy seed-layer; (b) after forming the photoresist pattern of the coil winding on the seed-layer, depositing through the photoresist mask pattern a second conductive metal or alloy, chemically distinct from the seed-layer, to form the coil winding; (c) after depositing the winding, thoroughly removing the photoresist mask; and (d) selectively etching the exposed seed-layer by subjecting the wafer to fluid etchant, which fluid etches or dissolves the first conductive metal or alloy seed-layer significantly faster than the second conductive metal (or alloy) coil winding to thereby remove the seed-layer between individual winding turns while leaving the coil winding essentially intact.

In particular, the preferred embodiment copper is used for the coil winding, as is now customary, but nickel-iron (Permalloy) alloy is used as the first conductive seed-layer material. A solution of nitric acid ($HNO_3$) and phosphoric acid ($H_3PO_4$) diluted in pure (deionized) water is used as the preferred selective etchant fluid. There are other choices of first and second conductive metals or alloys with appropriate selective etchants which are also suitable for use in this invention.

It should be noted that complete removel of the photoresist prior to etching is important to assure thorough and unimpeded removal of the seed-layer. Photoresist residue is adequately removed by two short low-power plasma-ashing cycles. The first cycle with oxygen (or dilute oxygen) plasma burns the photoresist residue. The second cycle of dilute hydrogen plasma removes the metal oxide formed during the first cycle.

An object of this invention is to provide a method to avoid attack and damage to the coil winding in a TFH transducer during the removal of the seed-layer between the winding turns.

Another object is to preserve the original (as plated) dimensions of the coil winding turns and to thereby minimize coil resistance and improve consistency of the coil resistance.

An additional object is to assure that essentially all exposed seed-layer material between coil winding turns is removed during the step of seed-layer etching to eliminate shorts between the winding turns.

A further object of this invention is to provide a simple, fast, and low-cost method to remove the coil seed-layer.

Another object of this invention is to prevent gap-wedge and zero-throat recession due to sputter-etching or ion-milling of the coil seed-layers(s).

A still further object of this invention is to lessen corrosion susceptibility and improve reliability of TFH transducers by eliminating dissimilar metals (or alloys) in the exposed pole-tip wings.

An additional object of the invention is to prevent electrical discharge from head to disk during contact and to help preserve the symmetric pulse shape desired for writing.

DESCRIPTION OF THE PREFERRED EMBODIMENTS

Figure 1:
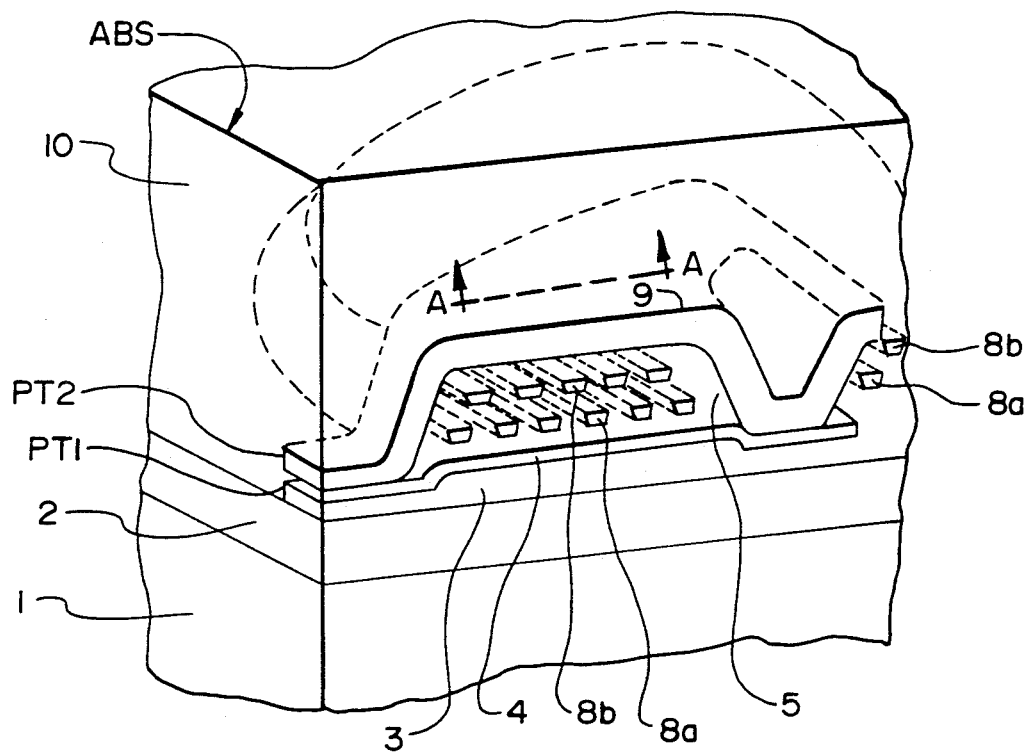
FIG. 1 is a perspective view showing a cross-sectional portion of a completed TFH transducer.

A completed thin film head (TFH) device is shown in perspective and cross-section in FIG. 1. The head is formed upon a non-magnetic wafer substrate 1 comprising a ceramic compound such as $Al_2O_3$-TiC, and a non-magnetic, insulating undercoat 2 of $Al_2O_3$. The head includes bottom 3 and top 9 magnetic poles (typically of Ni-Fe alloy), a flux gap 4 (typically of $Al_2O_3$) to separate the bottom pole tip PT1 from top pole tip PT2, conductive coil winding turns in a first layer 8a and a second layer 8b (commonly of Cu) interposed within insulation layer 5 (commonly of cured photoresist), and a non-magnetic insulating $Al_2O_3$ overcoat 10.

During wafer fabrication, where are many, usually several hundred, similar heads being simultaneously formed on the substrate wafer. After completion of the wafer fabrication, the wafer is cut into bars, or rows, and machined to define the air bearing surface (ABS) in FIG. 1. The bar is then cut into the individual heads, which are further machined (by lapping and polishing) to expose pole tips PT1 and PT2 and to establish the final ABS with the proper gap throat height.

Figure 2:
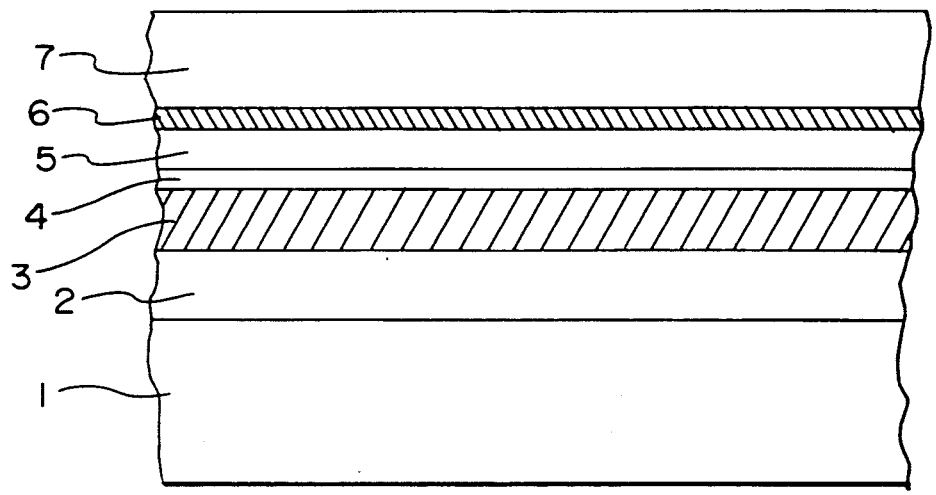

FIG. 2 shows a schematic side cross-section, taken along line A—A of FIG. 1, at the stage after a layer of photoresist 7 has been applied over seed-layer 6. The wafer is ready for photolithographic masking for the coil winding pattern definition. The photoresist layer thickness is about 2.5–4.0μm. Prior to this stage, the bottom magnetic pole 3 of Ni-Fe Permalloy was deposited and patterned over substrate 1 and undercoat 2. Gap layer 4 of $Al_2O_3$ was then sputter-deposited over bottom pole 3, followed by insulation layer 5 of cured photoresist. The photoresist is patterned, prior to curing, to be confined to the area over which the coil is to be located. Seed-layer 6 is then deposited over the entire wafer surface, covering the insulation layer 5 where the coil is to be formed, and the $Al_2O_3$ gap layer 4 is elsewhere. In the preferred embodiment, Ni-Fe (Permalloy) is used for seed-layer 6, with a thickness of about 0.1–0.2 μm.

A key part of the present invention is a proper choice of a material for the seed-layer 6. It must be compatible for plating the second metallic conductive material forming the coil winding 8a (first layer of coil) and also have an appropriate chemical etchant that will selectively dissolve the seed-layer 6 to remove it where exposed, but without significant etching of the winding turns 8a. Selection of the etchant is also important. Together, the coil winding material, the seed-layer material, and the etchant form a combination of materials that are functionally compatible for the purpose of this invention, in terms of their chemical properties. There are several different combinations that may be employed, but each combination must comprise at least three materials that have the stated compatibility with each other.

Figure 3:
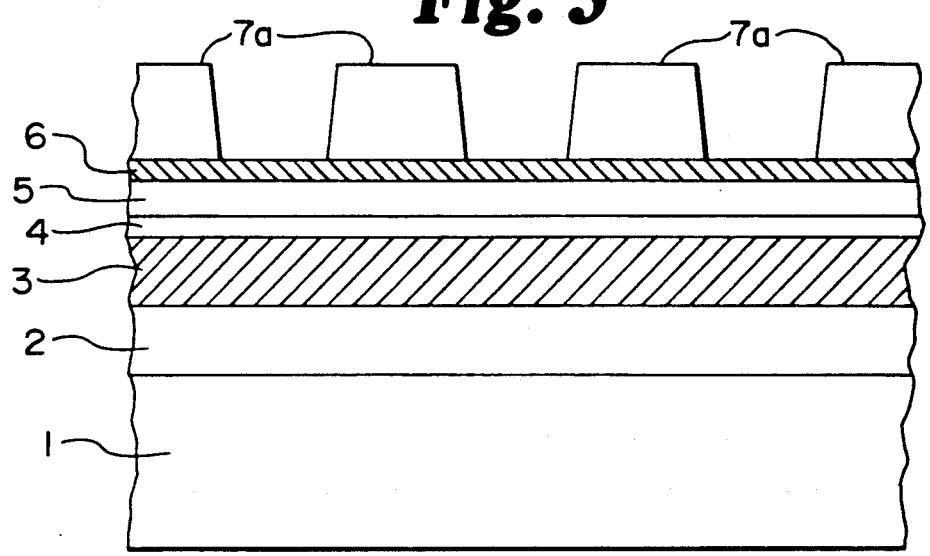
Figure 4:
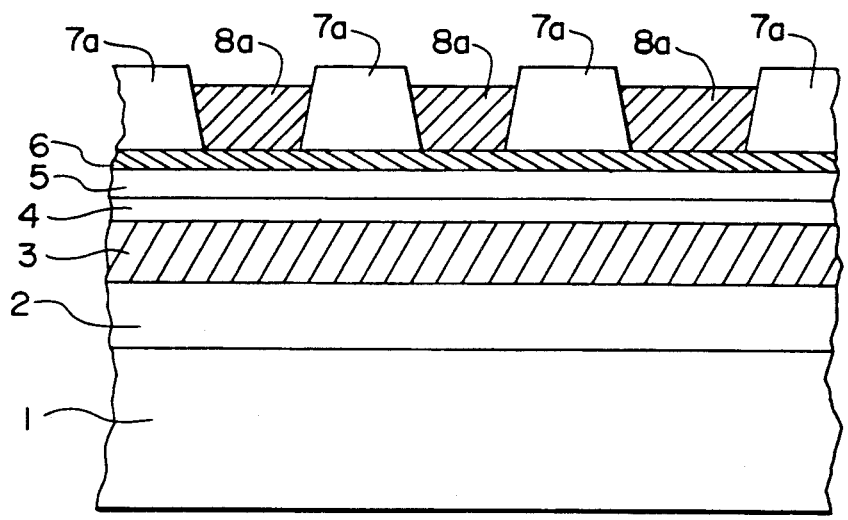

In FIG. 3, the photoresist 7 of FIG. 2 has been exposed and developed, i.e., a portion has been removed. The photoresist pattern projections 7a occupy areas to become lands between individual coil winding turns. The spaces between photoresist projections 7a expose the conductive seed-layer 6. In the next step, the wafer is immersed and plated in an electroplating solution of the coil winding material (usually Cu). The coil winding plating solution and the seed-layer must be compatible for plating. If the plating solution comprises ions of a more noble metal than the seed-layer, then a spontaneous displacement reaction may occur between the seed-layer and the plating solution. The displacement reaction can lead to poor adhesion and deteriorated plated winding. Also, the seed-layer must not have a significant passive film on it prior to commencing of plating; otherwise, the plated layer will have poor adhesion to the seed-layer. The Ni-Fe seed-layer and the copper plating solution are compatible for plating. Only the spaces between the photoresist projections 7a are plated to become windings 8a as is shown in FIG. 4. The photoresist pattern projections 7a shield seed-layer 6 underneath, and prevent plating in these areas, which will become lands between the individual winding turns. For demanding designs of coil winding (with large number of turns), it is now common to use winding turn width and land width of about 2–3μm each in the denser portion of the coil. It should be noted that although only a few turns are shown in FIGS. 3-7 in order to simplify the illustrations, actual designs include about 7 to 20 winding turns in each coil level.

FIG. 4 shows the stage after plating of the coil winding turns 8a between the photoresist pattern projections 7a. Typically the winding turns 8a are formed by depositing copper (Cu), but it is also possible to use other highly conductive metal or alloy materials, provided that they are compatible for plating and that there are suitable amd compatible seed-layer and etchant materials for the selective etching of the seed-layer. Copper is preferred for the coil winding 8a, because it is an excellent electrical conductor, inexpensive, and is already in use in the wafer fabrication for other features (such as bonding posts or studs). The thickness of the plated coil winding turns is about 2–3 $\mu$m.

Figure 5:
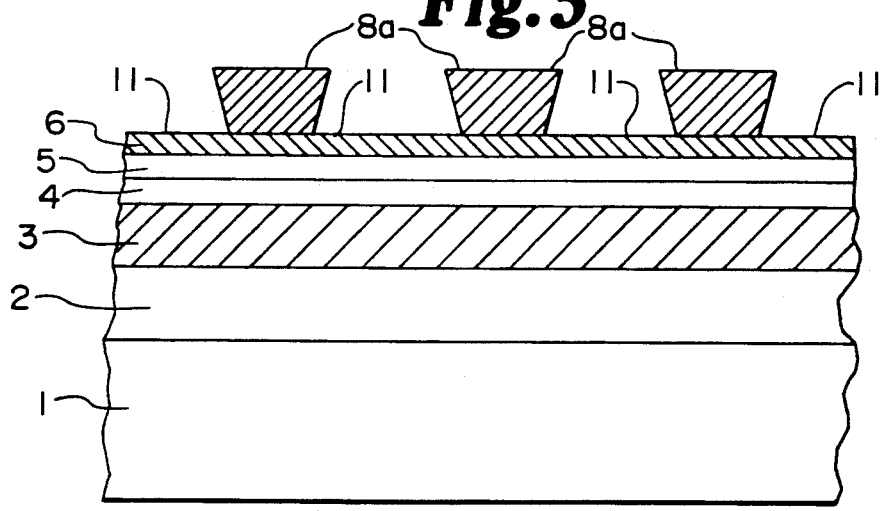

FIG. 5 shows the stage after the photoresist mask pattern 7a, of FIG. 4, has been removed. Conventional stripping processes may leave some photoresist residue 11 in the land spaces between the individual winding turns 8a. This residue 11 must be thoroughly removed to permit the next etching step of the seed-layer 6 to proceed properly. A two-cycle low-power plasma-ashing step is preferred for this purpose. The first cycle consists of 1 to 10 (preferably 1 to 4) minutes of oxygen or dilute oxygen (in argon) plasma with power of about 20 to 100 (preferably 30 to 50) watts and gas pressure in the range of 400 to 500 mTorr and a flow rate of 0.25 to 0.5 cc/min. The second cycle consists of dilute hydrogen (5–10% in argon or nitrogen) plasma with about the same time duration and power as the first cycle. Pressure for the second cycle is 700 to 900 mTorr, with a flow rate of 2 to 4 cc/min. The first cycle burns off the photoresist residue. The second cycle removes the surface oxide formed during the first cycle, as well as the native oxide. Alternatively, the photoresist residue may be removed by sputter-cleaning (low-power sputter-etching), or by an adequate commercial photoresist stripper. The two-cycle plasma-ashing method is preferred for its speed, simplicity, and consistency.

The wafer is now ready for selective etching of the seed-layer 6 from between the plated winding turns 8a. Selective etching is performed by subjecting the wafer to a compatible selective etchant fluid. Being compatible and selective means that the etchant dissolves or attacks seed-layer 6 significantly faster than the plated coil winding turns 8a, insulation 5, and gap 4. It must not significantly attack or dissolve any of the other solid materials that come in contact with it during the etching time. Also, the etching rate of the selectively etched solid material must not be too fast to cause uncontrollable undercutting, and not too slow to render it impractical. It should selectively etch the seed-layer at a moderate and controllable rate. During exposure to the selective etchant fluid, there should be negligible or no attack on the plated coil winding turns, insulation, and gap. In the preferred embodiment, a compatible combination of three materials is used, consisting of: Permalloy (about 84–80% Ni and 16–20% Fe, by weight) as the first metallic conductive seed-layer 6; copper (Cu) as the second metallic conductive plated coil winding turns 8a; and a selective etchant based on nitric acid and phosphoric acid mixture diluted with pure water. An adequate selective etchant comprises a mixture of 5–35% by volume (v/v) of concentrated (70%) nitric acid, 5–35% v/v of concentrated (85%) phosphoric acid, 0–25% v/v of concentrated (95%) sulfuric acid, and the balance of pure water. The preferred etchant consists of 10% v/v nitric acid, 10% v/v phosphoric acid, and 80% v/v pure water. This preferred etchant can be conveniently prepared by combining concentrated nitric acid, concentrated phosphoric acid, and pure water in the volume ratio of 1:1:8. Hereinafter we refer to this etchant as "1:1:8".

The etchant is preferably applied by spraying onto the wafer surface, but it is also satisfactory to dip the wafer in the liquid etchant with moderate agitation by mechanical or gas (nitrogen) bubbling means. The preferred temperature for the etching is room temperature, about 20°–25° C., for convenience. The entire temperature range of 10°–90° C. is satisfactory, with increasing etching rate with increasing temperature. For a typical Ni-Fe seed-layer thickness of 0.1 $\mu$m, and the 1:1:8 etchant at room temperature, the wafer should be exposed to the etchant for about four minutes for a complete clearing (etching) of seed-layer from between the coil winding turns 8a. For other thicknesses of seed-layer 6, the exposure time to the etchant should be proportional.

Figure 6:
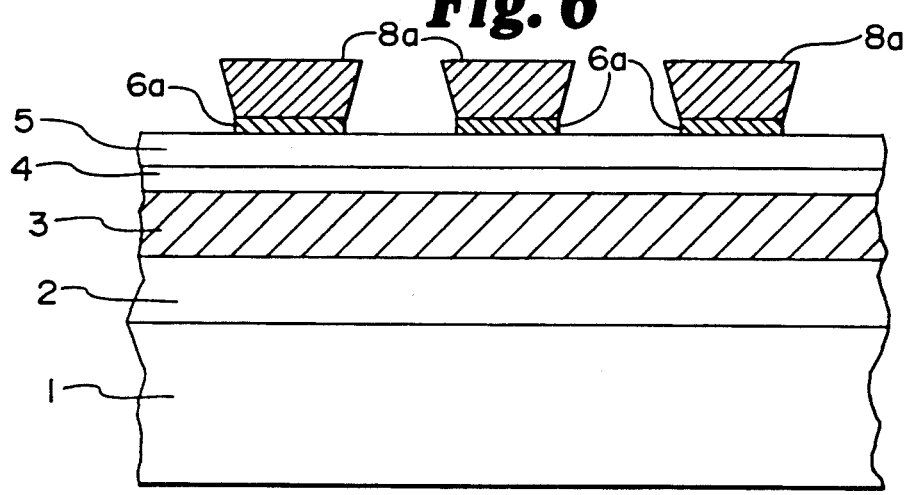

FIG. 6 shows the stage after completion of selective etching of the seed-layer 6 of FIG. 5. Seed-layer 6a is only left under coil winding turns 8a, and has been completely cleared from land areas in between. The use of the selective compatible etchant described above, has essentially no effect on the shape and dimensions of the individual turns 8a, inasmuch as copper is not significantly dissolved or attacked by this etchant. On the other hand, the Permalloy seed-layer is dissolved by it. Also, the selective etchant 1:1:8 does not attack, to any significant extent, insulation and gap features that become exposed to the etchant during etching.

Figure 7:
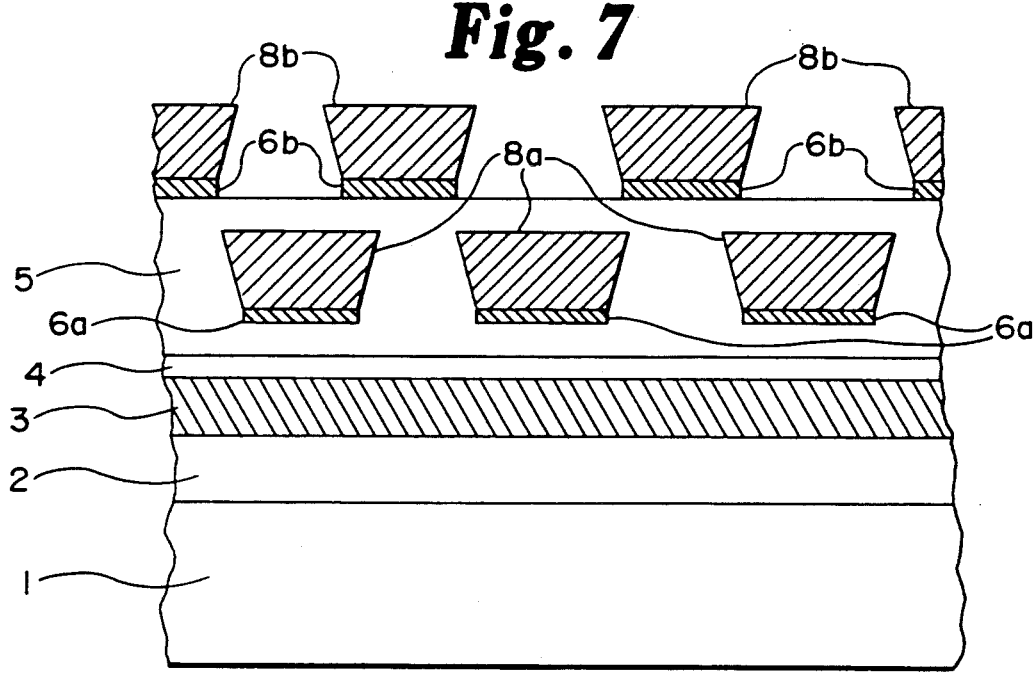
FIGS. 2-7 are side cross-sectional views, taken along line A—A of FIG. 1, at intermediate stages during the fabrication of the coil winding embodying the present invention.

FIG. 7 shows a two-level coil with windings 8a in a first level and windings 8b in a second level. The second level 8b has been formed in a similar manner to the first level 8a. After completion of selective etching of seed-layer 6a, shown in FIG. 6, additional insulation layer 5 is formed by depositing another layer of photoresist, patterning, and curing at elevated temperature. The additional insulation 5 completely fills the spaces between winding turns 8a as well as covering them. A second seed-layer is then deposited over the entire top wafer surface, followed by photoresist mask for the second coil winding level. The processing steps, described above for FIGS. 3–6, are then repeated to obtain the structure of FIG. 7. Later on, additional insulation 5 is formed on top of this structure, followed by deposition of the top magnetic pole 9 and thick Al$_2$O$_3$ overcoat 10, as shown in the final product of FIG. 1.

There are other possible compatible combinations of materials for use in this invention. Ni-Fe as the seed-layer material; gold (Au) as the coil winding material; and the 1:1:8 etchant as the selective fluid etchant is another embodiment of this invention. The gold plating solution and the Ni-Fe seed-layer are compatible for plating, provided that the solution pH is about 5–7, and contains the gold ions as a cyanide complex. A short gold strike plating (of about 100–1,000 Å) may be required prior to the plating. Depending on the photoresist, mask 7a may require post-baking (at 110°–130° C.) following its development, and prior to the gold plating. Gold coil winding offers several advantages. It is less susceptible to corrosion than copper, particularly during elevated temperature steps of curing the insulation layer and magnetic anneal, and it is compatible with a wide choice of other selective etchants. Also, gold is an excellent electrical conductor, and is already being plated for bonding pads in the TFH wafer fabrication. With gold coil windings and Ni-Fe seed-layer, more selective fluid etchants may be used. They include solutions comprising $HNO_3$-$H_3PO_4$-$H_2O$; solutions comprising one or more of the acids $HNO_3$, $H_3PO_4$, $H_2SO_4$, diluted in water with wide concentration ranges; dilute ferric chloride (with or without HCl) in water; dilute acidic ammonium persulfate in water; or any other etchant which selectively dissolves Permalloy at moderate and controllable rate, and leaves the gold coil winding, the gap, and insulation essentially intact. The 1:1:8 etchant described above would be suitable in combination with an Ni-Fe seed-layer and gold coil windings.

Another embodiment of the invention comprises tungsten (W) as the seed-layer material, copper as the coil winding material, and dilute hydrogen peroxide ($H_2O_2$) as the selective etchant. The etchant may comprise 2–30% $H_2O_2$ solution. Hydrogen peroxide is commonly available in a 30% solution, to which pure water is added to make up the required concentration. A 5% $H_2O_2$ solution is the preferred concentration. The temperature, application time, and manner of application are all similar to those of the Permalloy seed-layer and the 1:1:8 selective etchant described above.

Other combinations suitable for the present invention may comprise single-seed-layers from the group comprising Ni-Fe, Ni-Co, Ni-Co-Fe, W, Mo, Cd, and In. The single-seed-layer must have good electrical conductivity and strong adhesion to the gap and insulation materials. Metals or alloys that have high affinity to oxygen to form their respective metal oxides usually have strong adhesion to the gap and insulation materials. However, such metals and alloys usually are not highly electrical conductive. Typical thickness of the single-seed-layer is about 1,000–2,000 Å. Alternatively, the seed-layer may consist of multiple-seed-layers with a bottom (adhesion) seed-layer chosen from the group comprising Ti, Zr, V, Nb, Ta, Cr, Mo, W, and alloys comprising one or more elements thereof, and a top-seed-layer chosen from the group comprising Cu, Ag, Au, Pd, Pt, Rh, and alloys comprising one or more elements thereof. The bottom (or adhesion) layer consists of a metal or alloy with high affinity to oxygen with a typical thickness of about 100–300 Å. The top layer consists of a metal or alloy which is a highly electrical conductive with a typical thickness of about 700–1,500 Å. It may be noted that aluminum (Al) is both a highly conductive metal and one having high affinity to oxygen. However, Al is not compatible for plating the coil winding thereon. For multiple-seed-layers, more than one selective fluid etchant may be required in order to successively remove the different layers of the seed-layer. Coil winding materials may include the group comprising Cu, Ag, Au, Pd, Pt, Rh, and alloys comprising one or more elements thereof. The coil winding material must be highly electrical conductive and chemically distinct from the seed-layer. As previously stated, to be an adequate combination for this invention, a compatible and selective fluid etchant must exist, which is capable of selectively etching the seed-layer at a moderate and controllable rate while leaving the coil winding, the gap, and the insulation essentially intact.

While the invention has been particularly described with reference to preferred embodiments, it will be understood by those skilled in the art that various changes in form and detail may be made therein without departing from the spirit, scope, and teaching of the invention. For example while photolithography was described as the method for preparing the mask pattern for windings any other process that produces a suitable mask pattern could be used. Accordingly, examples herein disclosed are to be considered merely as illustrative and the invention to be limited only as specified in the claims.

What is claimed is:

1. A process for forming a thin film magnetic transducer head, including the steps of: depositing on a substrate a first metallic conductive seed-layer; forming a mask pattern on the seed-layer defining the shape of a coil winding for the head; and depositing through the mask pattern and onto the exposed seed-layer a second metallic conductive material, chemically distinct from the seed-layer, to form a coil winding, wherein the improvement comprises:
   (a) depositing a seed-layer comprising a first metallic conductive material;
   (b) after forming the mask pattern of the coil winding on the seed-layer, depositing as defined by the mask pattern a second metallic conductive material, chemically distinct from the seed-layer, to form the coil winding;
   (c) after depositing the coil winding, removing substantially all residue of the mask pattern to expose the seed-layer; and
   (d) selectively etching the exposed seed-layer by subjecting the seed-layer and coil-winding to a selective etchant, which etchant removes the first metallic conductive seed-layer material at a significantly higher rate than the second metallic conductive coil winding material to thereby remove the seed-layer from between individual coil winding turns while leaving the coil winding essentially intact.

2. The process of claim 1 wherein the first metallic conductive material for the seed-layer comprises a nickel-iron alloy, and the second metallic conductive material for the coil winding comprises copper.

3. The process of claim 2 wherein the selective etchant comprises a mixture of 5–35% by volume (v/v) concentrated nitric acid, 5–35% v/v concentrated phosphoric acid, 0–25% v/v concentrated sulfuric acid, and the balance of pure water.

4. The process of claim 2, wherein the selective etchant comprises a mixture of nitric acid and phosphoric acid diluted in pure water.

5. The process of claim 4, wherein the nitric acid and phosphoric acid are both concentrated and the volume ratio of concentrated nitric acid, concentrated phosphoric acid, and pure water is 1:1:8.

6. The process of claim 1, wherein the step of depositing the first metallic conductive material for the seed-layer comprises depositing nickel-iron alloy; wherein the step of depositing the second metallic conductive material for the coil winding comprises depositing copper; and the selective etching step includes applying a mixture comprising nitric acid and phosphoric acid diluted in pure water.

7. The process of claim 6, wherein the selective etching step includes applying a mixture of nitric acid and phosphoric acid with volume ratio of 1:1, that is diluted in pure water.

8. The process of claim 1 wherein the first metallic conductive material for the seed-layer comprises a nickel-iron alloy, and the second metallic conductive material for the coil winding comprises gold.

9. The process of claim 8 wherein the selective etchant is a solution comprising one or more of the acids $HNO_3$, $H_3PO_4$, $H_2SO_4$, diluted in pure water.

10. The process of claim 8 wherein the selective etchant is a solution comprising concentrated nitric acid and phosphoric acid diluted in pure water.

11. The process of claim 10 wherein the volume ratio of concentrated nitric acid, concentrated phosphoric acid, and pure water is 1:1:8.

12. The process of claim 8 wherein the selective etchant comprises a dilute solution of ferric chloride and HCl in pure water.

13. The process of claim 8 wherein the selective etchant comprises a dilute solution of ferric chloride in pure water.

14. The process of claim 8 wherein the selective etchant comprises dilute acidic ammonium persulfate in pure water.

15. The process of claim 1 wherein the first metallic conductive material for the seed-layer comprises tungsten, and the second metallic conductive material for the coil winding comprises copper.

16. The process of claim 1 wherein the first metallic conductive material comprises tungsten, the second metallic conductive material comprises copper, and the selective etchant comprises dilute hydrogen peroxide.

17. The process of claim 16 wherein the hydrogen peroxide concentration is approximately 2 to 30%.

18. The process of claim 16 or 17 wherein the hydrogen peroxide concentration is approximately 5%.

19. The process of claim 1 wherein the step of depositing the seed-layer of a first metallic conductive material comprises depositing a single-seed-layer of material selected from the group consisting of Ni-Fe, Ni-Co, Ni-Co-Fe, W, Mo, Cd, and In.

20. The process of claim 1 wherein the step of depositing a seed-layer of a first metallic conductive material comprises depositing a bottom-seed-layer of material selected from the group consisting of Ti, Zr, V, Nb, Ta, Cr, Mo, W, and alloys comprising one or more elements thereof, and thereafter depositing a top-seed-layer of material selected from the group consisting of Cu, Ag, Au, Pd, Pt, Rh, and alloys comprising one or more elements thereof.

21. The process of claim 19 or 20 wherein the step of depositing the second metallic conductive material for the coil winding comprises depositing a material selected from the group consisting of Cu, Ag, Au, Pd, Pt, Rh, and alloys comprising one or more elements thereof, said selected material being chemically distinct from any material selected for the seed-layer.

22. The process of claim 1 wherein the step of removing substantially all residue of the mask pattern to expose the seed-layer comprises low-power plasma ashing.

23. The process of claim 22 wherein the low-power plasma ashing comprises a first ashing cycle with oxygen plasma and a second ashing cycle with dilute hydrogen plasma.

24. A process for forming a thin film magnetic transducer head, having one or more coil winding layers, the formation of each coil winding layer including the steps of: depositing on a substrate a first metallic conductive seed-layer; forming a mask pattern on the seed-layer defining the shape of a coil winding for the head; and depositing through the mask pattern and onto the exposed seed-layer a second metallic conductive material, chemically distinct from the seed-layer, to form a coil winding, wherein the improvement comprises:
 (a) depositing a seed-layer comprising a first metallic conductive material;
 (b) after forming the mask pattern of the coil winding on the seed-layer, depositing as defined by the mask pattern a second metallic conductive material, chemically distinct from the seed-layer, to form the coil winding;
 (c) after depositing the coil winding, removing substantially all residue of the mask pattern to expose the seed-layer;
 (d) selectively etching the exposed seed-layer by subjecting the seed-layer and coil-winding to a selective etchant, which etchant removes the first metallic conductive seed-layer material at a significantly higher rate than the second metallic conductive coil winding material to thereby remove the seed-layer from between individual coil winding turns while leaving the coil winding essentially intact; and
 (e) for each additional coil winding layer, forming an additional insulation layer over the area of the coil winding formed in accordance with steps (a) to (d) and repeating in sequence steps (a) to (d).

25. The process of claim 24 wherein the step of depositing an insulation layer comprises depositing photoresist material, patterning it on the area of the preceding coil winding and curing it at elevated temperature.

26. A thin film magnetic transducer head produced in accordance with a process as recited in claim 1, 2, 8, 15 or 24.

* * * * *